United States Patent
Terashima et al.

[11] Patent Number: 6,163,647
[45] Date of Patent: Dec. 19, 2000

[54] APPARATUS FOR SYNCHRONIZED PLAYBACK OF AUDIO-VIDEO SIGNALS

[75] Inventors: Masaru Terashima; Takashi Samejima; Mitsumasa Tanaka; Hideki Sawada, all of Tokyo, Japan

[73] Assignee: NEC Corporation, Tokyo, Japan

[21] Appl. No.: 08/982,977

[22] Filed: Dec. 2, 1997

[30] Foreign Application Priority Data

Dec. 2, 1996 [JP] Japan .................................. 8-321537

[51] Int. Cl.$^7$ .................................................. H04N 5/928
[52] U.S. Cl. .............................. 386/96; 386/98; 386/106
[58] Field of Search ................................ 386/46, 98, 104, 386/105, 106, 96, 95, 111, 112, 125, 75; H04N 5/76, 5/928

[56] References Cited

U.S. PATENT DOCUMENTS

| | | | |
|---|---|---|---|
| 5,565,996 | 10/1996 | Ueda | 386/98 |
| 5,583,652 | 12/1996 | Ware | 386/104 |
| 5,617,502 | 4/1997 | Ort et al. | 386/106 |
| 5,671,319 | 9/1997 | Ueda | 386/96 |
| 5,815,634 | 9/1998 | Daum et al. | 386/98 |

FOREIGN PATENT DOCUMENTS

| | | |
|---|---|---|
| 6-121276 | 4/1994 | Japan . |
| 7-87324 | 3/1995 | Japan . |
| 7-107514 | 4/1995 | Japan . |
| 7-303240 | 11/1995 | Japan . |
| 8-321537 | 12/1996 | Japan . |

*Primary Examiner*—Huy Nguyen
*Attorney, Agent, or Firm*—Ostrolenk, Faber, Gerb & Soffen, LLP

[57] ABSTRACT

An apparatus for producing synchronized playback of compressed digital data of audio-video signals from a desired portion of the digital data. The apparatus can be used in a system having comparatively low data processing ability, and work independent of the resolution of a software timer of the system. The apparatus comprises a frame counter for obtaining a reference time indicating reproduction time passage of the audio signal component from a reproduced data amount of the audio signal component. A delay detector detects progress of the video signal component in reference to the reference time.

16 Claims, 6 Drawing Sheets

APPARATUS FOR SYNCHRONIZED PLAYBACK OF AUDIO-VIDEO SIGNALS

BACKGROUND OF THE INVENTION

The present invention relates to an apparatus for synchronized playback of audio-video (hereafter abbreviated as AV) signals, wherein compressed digital data of AV signals are decompressed into a video signal component and an audio signal component to be represented in synchronization with each other.

In the synchronized playback of AV signals, compressed digital data of AV signals read out from recording media such as a CD-ROM (Compact Disk Read Only Memory) or a hard disk device are decompressed before being represented through output devices such as a CRT monitor and a speaker. When the apparatus for the synchronized playback is provided with a data processing ability sufficiently high for the data decompression of the AV signals, or when the video signal size of the compressed digital data is comparatively small, the data decompression of both of the video signal component and the audio signal component can be performed within a short time, and so, audio data and video frames can be reproduced without interruption.

However, when the data processing ability of the apparatus is not sufficiently high compared to the video signal size of the compressed digital data, the apparatus can not reproduce both the audio signal component and the video signal component in real time with which they are recorded originally, taking too much time for the data decompression processes. As a consequence, the video signal component may be represented as a slow-motion film and the audio signal component is reproduced intermittently.

The intermittent reproduction of the audio signal component gives a sense of intense incongruity to the human hearing. Therefore, the audio signal component is usually processed to be reproduced continuously with a priority over the video signal component. The data decompression and displaying process of the video signal component is performed when the audio signal component is not processed. Here, adequate thin down of the picture frames (so-called frame omission) becomes necessary for synchronizing the presentation timings of the audio signal component and the video signal component so that the video signal component may not be delayed from the audio signal component.

As for the digital data compression, there is known an MPEG (Motion Picture Experts Group) standard, wherein the audio signal component and the video signal component separated of the AV signals are compressed independently into two data streams, an audio stream and a video stream. Each of the two data streams is divided into blocks, called packets, having a fixed length generally determined according to requirement of recording or transmission media, that is, a sector length of CD-ROM, for example. The audio stream and the video stream are multiplexed into a system stream composed of a mixed succession of these packets ranged in time order of both the audio stream and the video stream.

Figure 2:
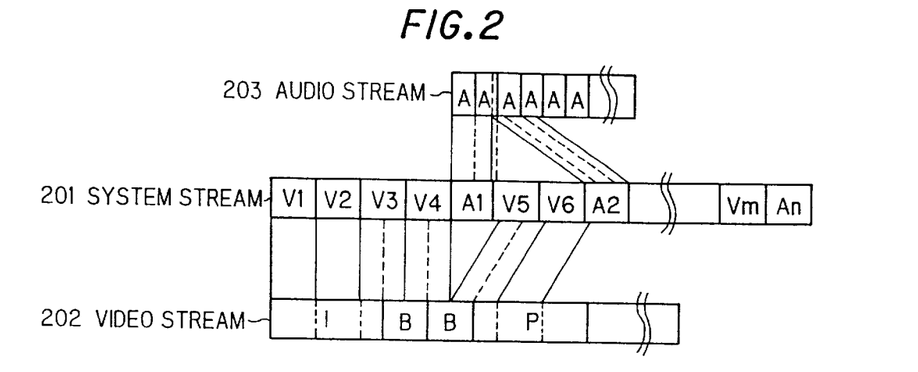
FIG. 2 is a schematic diagram illustrating a system stream 201 comprising video packets V1 to Vm composing a video stream 202 and audio packets A1 to An composing an audio stream 203.

FIG. 2 is a schematic diagram illustrating a system stream 201 comprising video packets V1 to Vm composing a video stream 202 and audio packets A1 to An composing an audio stream 203.

Apart from the unit of packets, the video stream 202 consists of compressed data of each picture frame denoted by a symbol I (Intra picture), B (Bidirectionlly predictive picture) or P (Predictive picture) as illustrated in FIG. 2, while the audio stream 203 consisting of compressed data of each audio frame denoted by a symbol A. Reproduction time of each picture may differ to that of each audio frame. Therefore, timing information called a time stamp is comprised in header information of packets including beginning of a picture or an audio frame, so as to enable synchronized playback of the AV signals referring thereto.

As a prior art technique of the synchronized playback of the audio (voice) signal component and the video (picture) signal component from such compressed data, there is, for example, a Japanese patent application entitled "An apparatus for compression and reproduction of AV signals" and laid open as a Provisional Publication No. 107514/'95 (hereafter called the first prior art apparatus).

In the first prior art apparatus, color difference information is thinned down in a video data compression procedure considering the processing speed of the reproduction apparatus. Compensating the thinned down color difference information by simple interpolation, the decompression procedure of the video data is performed at a high speed, enabling synchronized reproduction of the video data and the audio data.

In another Japanese patent application entitled "Variable speed synchronized playback of recorded digital audio and video data" and laid open as a Provisional Publication No. 303240/'95 (hereafter called the second prior art apparatus), there is proposed another method of synchronized playback with a variable speed of the audio signal component and the video signal component.

In this method, a time required for decompression and playback of a frame of the video signal component, and a time required for decompression and reproduction of a block of the audio signal component are calculated from respective attribute information of each thereof. One of the calculated times is used as a master time clock for decompession of the audio signal component and the video signal component. The audio signal component and the video signal component are decompressed more speedily or more slowly according to a scaling factor of the master time clock indicated by a user.

There are also Japanese parent applications laid open as Provisional Publication No. 87324/'95 and No. 121276/'94 (hereafter called the third prior apparatus). In the third prior apparatus, the video signal component of a picture frame is compressed together with the audio signal component corresponding to the picture frame, and when data compression procedure of the video signal component is found to be delayed from that of the audio signal component, data compression of a part or a whole of the picture frame is omitted. In the same way, when data decompression of the video signal component is found to be lagged from that of the audio signal component in the reproduction, decompression of a part or a whole of the picture frame is omitted.

Thus, a synchronized reproduction of the AV signals is realized. Furthermore, having such a data stream as above mentioned, reproduction from a desired part of the AV signals can be performed in synchronization, in the third prior apparatus.

However, there are problems in these prior apparatus.

The problem of the first prior art apparatus is that feedback control means for the synchronization are not provided. In the first prior art apparatus, the thinning down of the color difference information is performed a priori in the data compression procedure according to the information amount of the video signal component to be processed, and no means are provided for detecting lead or lag of a displayed video frame to the corresponding audio data. Therefore, unnecessary thinning down of color difference information is performed even when the playback apparatus is provided with sufficient data processing ability, and restoration of the lead or lag of the video signal component to the audio signal component can not be performed flexibly, in the first prior art apparatus.

The problem of the second prior art apparatus is that a TDHS (Time Domain Harmonic Scaling) system is used for synchronizing reproduction of the audio signal component to the scaled master time clock. The TDHS system requires complicated processing which is inconvenient to be applied to the playback system with low data processing ability, without saying of the distortion of the audio signal component.

The problem of the third prior art apparatus lies in that they cannot be applied to compressed data having such a data stream as the MPEG standard wherein data of picture frames and audio frames having different reproduction time are compressed independently.

Furthermore, when the playback apparatus is implemented with software operating on an operating system with a low resolution software timer, there is a problem that correct synchronization between the audio signal component and the video signal component cannot be obtained because of the low resolution of the software timer, even if the feedback control means are provided. A fine resolution of a hardware timer, a CPU clock, for example, can be used, of course. However, use of the hardware timer makes the apparatus hardware-dependent, and thus not applicable to any device but to computers having a specific CPU clock hertz.

This is another problem of the prior art apparatus.

SUMMARY OF THE INVENTION

Therefore, an object of the present invention is to provide an apparatus for a synchronized playback of audio-video signals with a simple configuration to be applied to a system having comparatively low data processing ability such as a personal computer, wherein the video signal component can be decompressed and reproduced in synchronization with the audio signal component adequately from a desired part of the audio-video signal even of the compressed digital data having such a system stream as the MPEG standard, according to the data processing ability of the system, independent of resolution of the software timer of the system.

In order to achieve the object, an apparatus for synchronized playback of audio-video signals of the invention, for representing an audio signal component and a video signal component in synchronization with each other by decompressing compressed digital data of the audio signal component and the video signal component, comprises:

means for obtaining a reference time indicating reproduction time passage of the audio signal component from reproduced data amount of the audio signal component added with a compensation amount, referring to header information of the compressed digital data which includes a sampling rate of the audio signal component and a frame rate of the video signal component;

a video frame counter for counting and maintaining a real frame number indicating a number of processed picture frames by accumulating a number of picture frames actually decompressed and a number of picture frames omitted to be decompressed;

a delay detector for calculating an ideal frame number of the video signal component to be displayed originally from said reference time and said frame rate, and detecting progress of the video signal component by comparing said real frame number added with a compensation number to said ideal frame number; and means for calculating the compensation amount and the compensation number from a position of the audio-video signals wherefrom the synchronized playback is indicated, referring to the header information.

Therefore, the video signal component can be decompressed and reproduced in synchronization with the audio signal component adequately from the compressed digital data from a desired part of the AV. A simple configuration according to the data processing ability of a system where the apparatus of the invention is can be used. The solution is independent of the resolution of the software timer of the system, and without the need for any special hardware timer.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

The apparatus of the invention reproduces AV signals from compressed data having a system stream 201 of FIG. 2, compatible to that of the MPEG standard, recorded on a random access recording media such as the CD-ROM. Each of the video stream 202 and the audio stream 203 has each fixed data rate. Therefore, in the system stream 201 comprising video paclets V1 to Vm and audio packets A1 to An, as beforehand described, these packets are arranged in proportion to their data rates, and the data rate of the system stream 201 is equal to a sum of the data rate of the video stream 202 and the audio stream 202.

Having been thus arranged, video packets and audio packets can be accessed more efficiently than they are recorded separately, and they can be synchronized with small buffer memories by reading them sequentially out of the recording media.

Now, embodiments of the present invention will be described in connection with the drawings.

Figure 1:
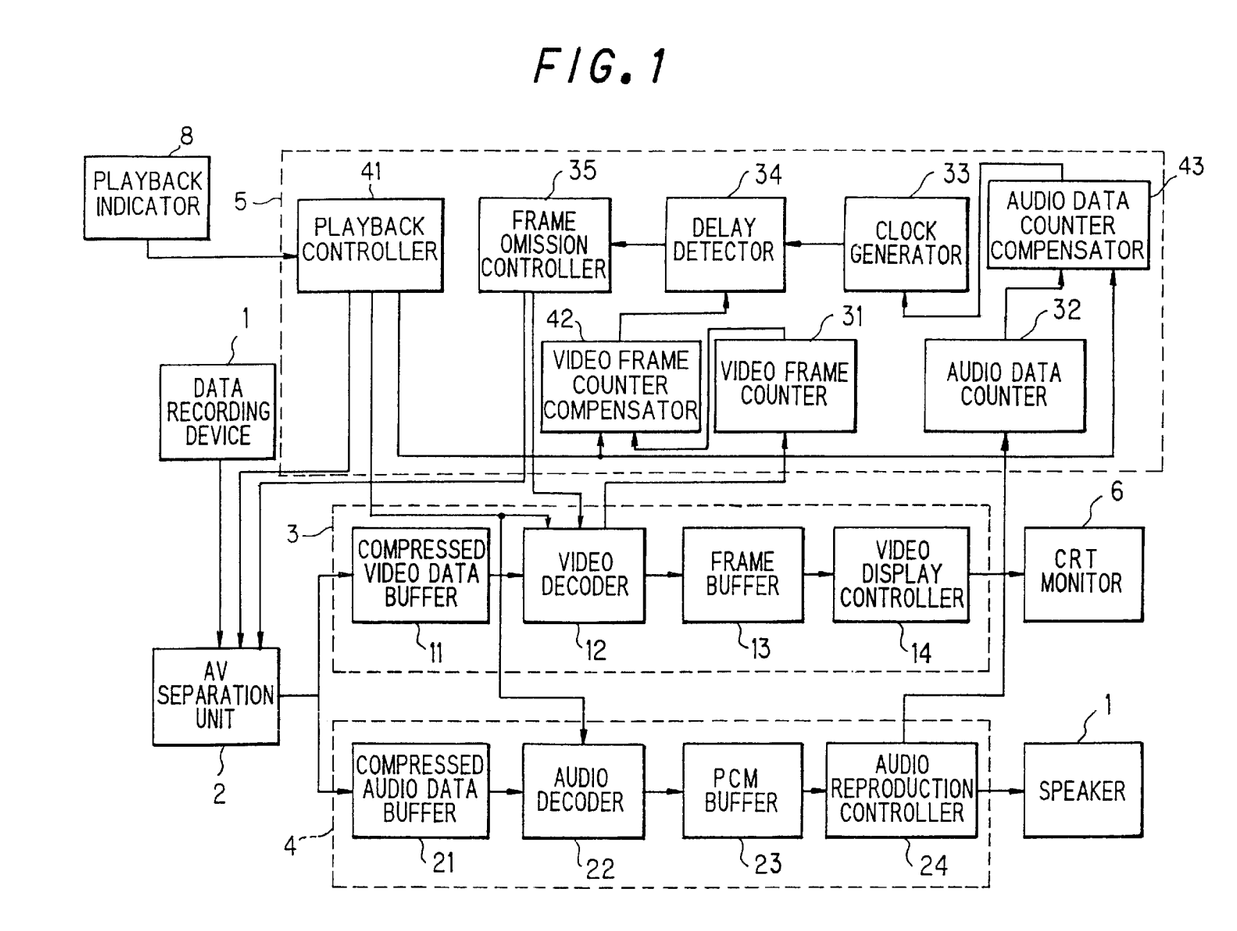
FIG. 1 is a block diagram illustrating a fundamental configuration of an apparatus for a synchronized playback of audio-video signals according to an embodiment of the invention.

Referring to FIG. 1, the apparatus comprises a data recording device 1 which stores compressed digital data of AV signals, An AV separation unit 2 extracts an audio signal component and a video signal component multiplexed in the compressed digital data read out of the data recording device 1.

A video signal processor 3 performs decompression of the video signal component extracted by the AV separation unit 2.

An audio signal processor 4 performs decompression of the audio signal component extracted by the AV separation unit 2.

An AV synchronization controller 5 performs synchronization control between the audio signal component and the video signal component.

A CRT monitor 6 displays the video signal component.

A speaker 7 reproduces the audio signal component.

A playback indicator 8 receives a user input playback indication.

The video signal processor 3 include a compressed video data buffer 11 which stores compressed data of the video signal component extracted by the AV separation unit 2.

A video decoder 12 decompresses the compressed data of the video signal component buffered in the compressed video data buffer 11 by analyzing attribute information (video header information) thereof.

A frame buffer 13 buffers frame data of the video signal component decompressed by the video decoder 12.

A video display controller 14 generates display signals to be supplied to the CRT monitor 6 by reading out the frame data prepared in the frame buffer 13 in synchronization with synchronous signals for the CRT monitor 6.

The audio signal processor 4 includes a compressed audio data buffer 21 which stores compressed data of the audio signal component extracted by the AV separation unit 2.

An audio decoder 22 decompresses the compressed data of the audio signal component buffered in the compressed audio data buffer 21 by analyzing attribute information (audio header information) thereof.

A PCM buffer 23 stores data of the audio signal component decompressed by the audio decoder 22.

An audio reproduction controller 24 generates sound signals to be supplied to the speaker 1 according to the data of the audio signal component supplied from the PCM buffer 23.

The AV synchronization controller 5 include a video frame counter 31 which counts and maintains a real frame number of the video signal component which indicates a sum of a frame number actually decompressed and a frame number omitted to be decompressed by the video decoder 12, from the beginning of reproduction.

An audio data counter 32 counts and maintains a data amount of the audio signal component actually decompressed and reproduced by the audio reproduction controller 24 from the beginning of reproduction according to reproduction information supplied from the audio reproduction controller 24.

A clock generator 33 calculates a reference time indicating reproduction time passage of the audio signal component from the data amount counted by the audio data counter 32 referring to the audio header information analyzed by the audio decoder 22.

A delay detector 34 calculates an ideal frame number of the video signal component to be displayed originally from the reference time calculated by the clock generator 33 referring to the video header information analyzed by the video decoder 12. Delay detector 34 further detects lead or lag of the video signal component to the audio signal component by comparing the ideal frame number to the real frame number counted by the video frame counter 31.

A frame omission controller 35 performs frame omission when the video signal component is delayed from the audio signal component and decompression waiting when the video signal component is leading the audio signal component according to the lead or lag detected by the delay detector 34 referring to a priority of frames to be decompressed.

A video frame counter compensator 42 compensates the real frame number counted by the video frame counter 31 and referred to by the clock generator 33.

An audio data counter compensator 43 compensates a reproduced audio data amount counted by the audio data counter 32 and referred to by the clock generator 33.

A playback controller 41 controls a playback position of the AV signals according to the playback indication of the user input through the playback indicator 8. This is done by controlling the AV separation unit 2, the video decoder 12, the audio decoder 22, the video frame counter compensator 42 and the audio data counter compensator 43.

Here, the frame omission is performed according to the order of priority of frames as will be described in the following paragraphs, and the decompression waiting is performed when a lead of the video signal component is detected by the delay detector 34 until the audio signal component overtakes the video signal component.

Now, the order of priority of frames is described.

Figure 3:
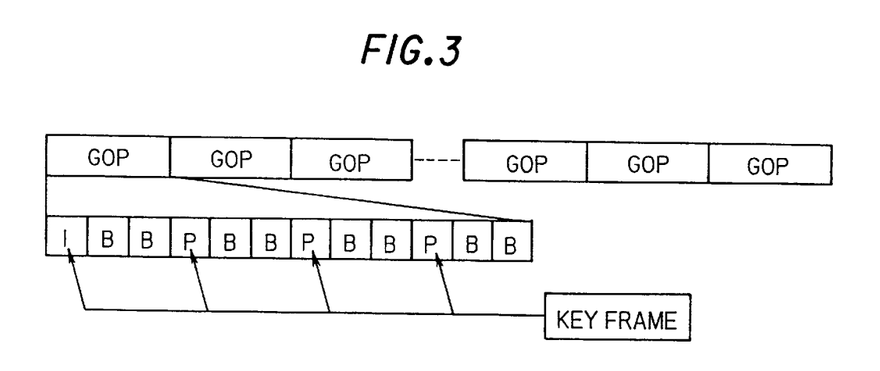
FIG. 3 is a schematic diagram illustrating an example of a data stream of the video signal component subjected to frame omission.

FIG. 3 is a schematic diagram illustrating an example of the video stream 202 of FIG. 2, comprising video frames subjected to the frame omission performed by the frame omission controller 35. In the example, frame data of the video signal component are arranged according to an inter-frame prediction coding system such as the MPEG standard.

Referring to FIG. 3, the data of the video signal component has a frame composition comprising a plurality of GOP (Group Of Pictures) data, each including data of I (Intra), P (Predictive) and B (Bidirectionally predictive) pictures. The I-picture, coded from intra-frame data, can be decompressed independently from itself without any key frame, and is used as a key frame to be referred to when following frames are decompressed. The P-picture, coded according to forward prediction, is decompressed referring to a preceding key frame. The P-picture is also used as a key frame to be referred to when following and preceding frames are decompressed. The B-picture, coded according to bi-directional prediction, is decompressed referring to a preceding key frame and a following key frame, and is referred to by no other frame.

The key frame is a picture to be referred to when other pictures are decompressed, and so, when a key frame is omitted to be decompressed, following P and B-pictures until a next I-picture appears should be also omitted, as they are unable to be decompressed.

Therefore, the frame omission priority is attributed to the B-picture, that P-picture and the I-picture, in the order.

Figure 4:
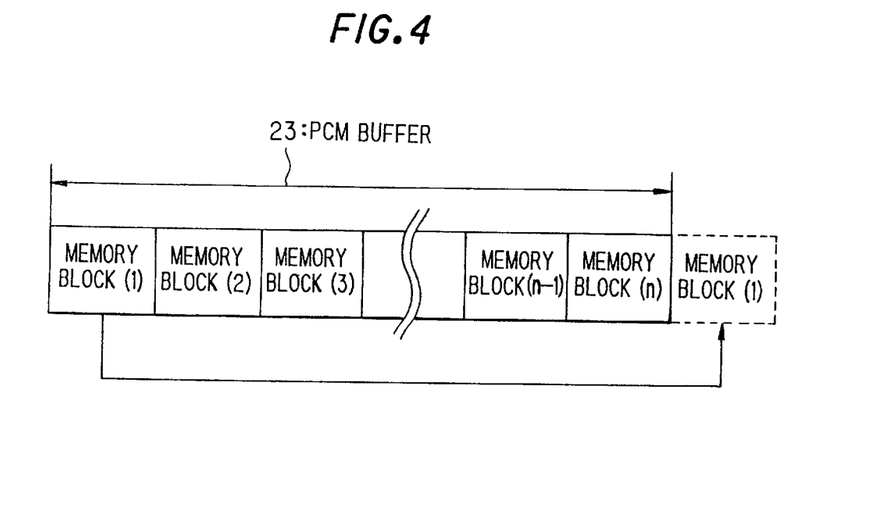
FIG. 4 is a schematic diagram illustrating the PCM buffer 23 of FIG. 1 for storing the data of the audio signal component to be reproduced.

Now, the PCM buffer 23 for storing the data of the audio signal component to be reproduced is described referring to a schematic diagram of FIG. 4.

The PCM buffer 23 operates as a ring buffer comprising a plurality of memory blocks (1) to (n), wherein the data of the audio signal component decompressed by the audio decoder 22 are stored to be read out and supplied to the audio reproduction controller 24 in turns cyclically to be reproduced.

When the audio reproduction controller 24 finishes reproduction of data read out and transferred from a memory block of the PCM buffer 23, an interruption occurs and data in the next memory block is transferred to the audio reproduction controller 24 to be reproduced. The audio decoder 22 reads out and decompresses the audio signal component to be stored in the next memory block and interrupts processing of the video signal component even when the video signal component is under processing. For example, when reproduction of data of the memory block (1) of FIG. 4 is accomplished, data of the memory block (2) is read out, transferred to the audio reproduction controller 24, and reproduced. In the memory block (1), data of the audio signal component newly decompressed by the audio decoder 22 is stored to be read out after reproduction of data of the memory block (n) is accomplished.

Thus, the audio signal component is decompressed with the interruption processing prior to other procedures such as the decompression process of the video signal component. Therefore, the audio signal component can be reproduced without interruption, and accordingly, a precise reproduction time can be obtained from reproduction progress of the audio signal component at the audio reproduction controller 24.

Now, operation of the synchronized playback of AV signals in the embodiment of FIG. 1 is described referring to flowcharts of FIGS. 5 to 8.

Figure 5:
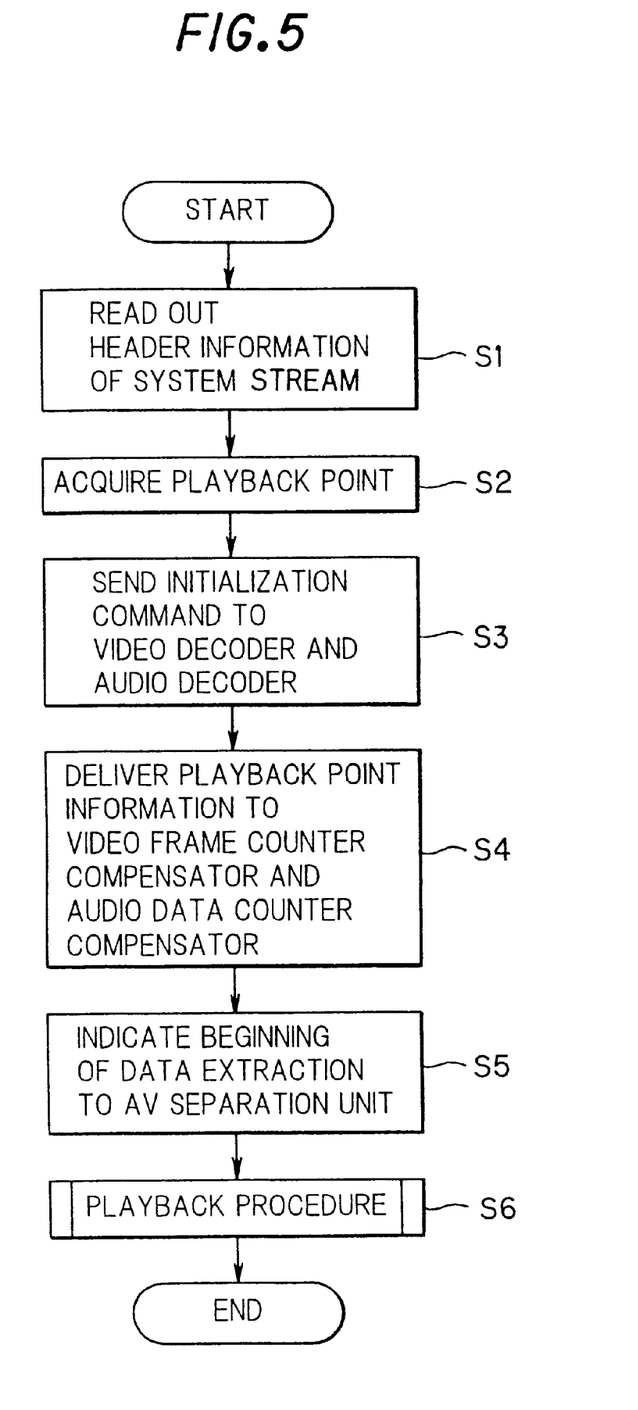
FIG. 5 is a flowchart illustrating playback control processes of the embodiment of FIG. 1.

FIG. 5 is a flowchart illustrating playback control processes of the embodiment, which are performed according to playback indication of a user. There may be various types of the playback indication, such as playback from a part of an AV program, skip or repetition of a part of the AV program actually under reproduction and so on. However, these all may be converted into positional or time information of a playback point from where a playback should begin, and so, in the following description, the playback indication is represented by a time interval of the playback point from the beginning of the program.

At the beginning of playback of a program, started by an insertion of a CD-ROM, for example, the header part of the program file is read out from the data recording device 1 (at step S1) to obtain and analyze header information of the system stream.

At step S2, the playback point indicated through the playback indicator 8 is acquired by the playback controller 41. The playback controller 41 sends initialization commands to the video decoder 12 and the audio decoder 22 (at step S3). Receiving the initialization command, the video decoder 12 controls the video display controller 14 to stop display signal to the CRT monitor 6, clears the frame buffer 13 and the compressed video data buffer 11 for restoring compressed data of the video signal component newly extracted, and resets the real frame number counted by the video frame counter 31 to zero. In the same way, the audio decoder 22 stops reproduction of the audio signal component at the audio reproduction controller 24 and clears the PCM buffer 23 and the compressed audio data buffer 21. The reproduced audio data amount counted by the audio data counter 32 is also reset to zero when the audio reproduction controller 24 is stopped.

Then, the playback controller 41 delivers information of the playback point to the video frame counter compensator 42 and the audio data counter compensator 43 (at step S4), and indicates (at step S5), to the AV separation unit 2, to begin extraction of the video signal component and the audio signal component from the playback point by reading out the compressed digital data from the data recording device 1 (as will be described afterwards).

Thus, the playback of the AV program is performed (at step S6) until the end of the program or another playback indication is input through the playback indicator 8.

Figure 6:
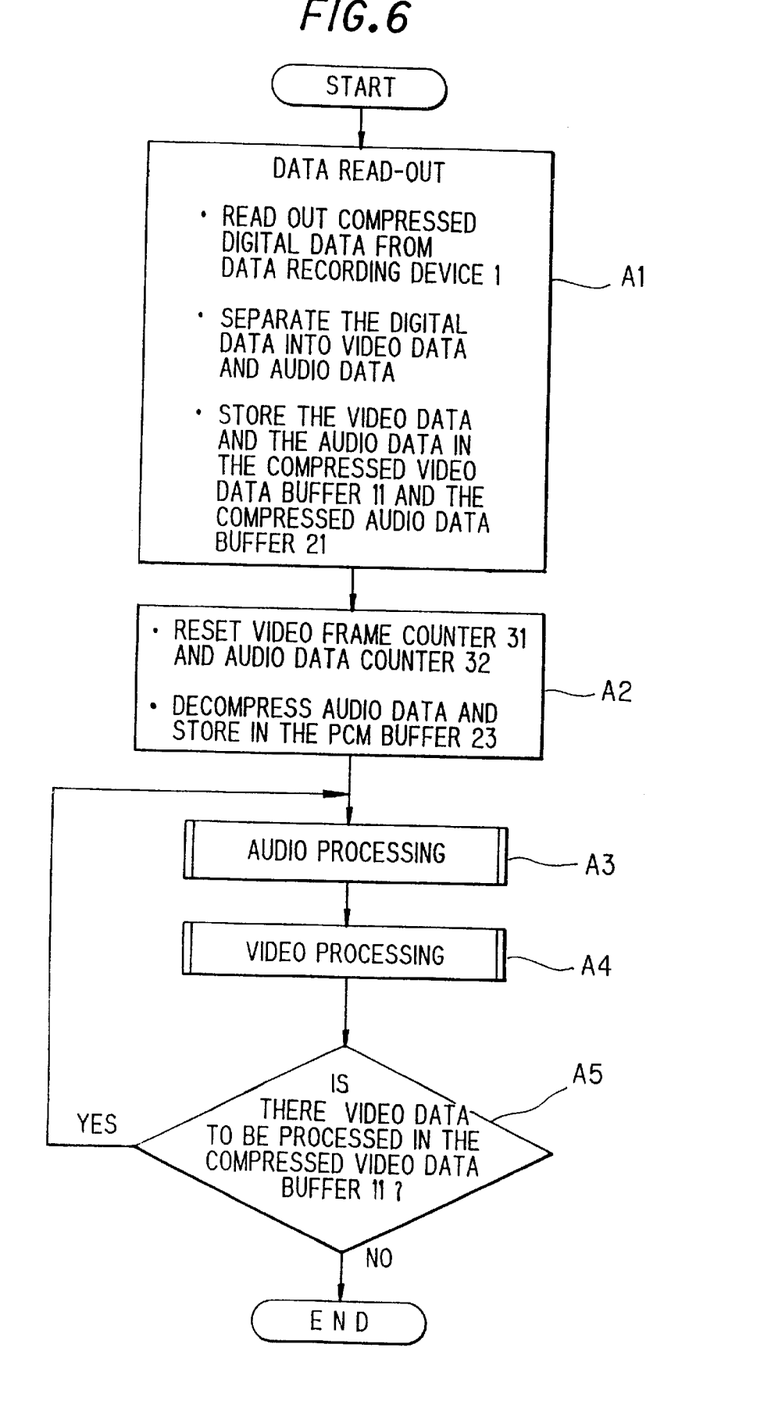
FIG. 6 is a flowchart illustrating a playback procedure performed at step S6 of FIG. 5.

Now, the main routine of the playback procedure performed at step S6 is described referring to a flowchart of FIG. 6.

First, the main routine is described when an AV program is indicated to be reproduced from its beginning.

As an initializing procedure, data read-out (at step A1) and audio data decompression (at step A2) are performed at the beginning of the reproduction of AV signals.

At step A1, a block of multiplexed digital data, following the header part of the system stream 201 read out at step S1 of FIG. 5, of compressed AV signals is read out from the data recording device 1. The block of multiplexed digital data is separated into the video stream 202 and the audio stream 203, which are stored in the compressed video data buffer 11 and the compressed audio data buffer 21, respectively. Then, at step A2, the video frame counter 31 and the audio data counter 32 are both reset to zero, and audio data decompression is executed. Compressed data of the audio signal component to be prepared in all the memory blocks of the PCM buffer 23 are read out from the compressed audio data buffer 21 and decompressed referring to the audio header information.

After the initialization procedure, audio processing (at step A3) and the video processing (at step A4) are repeated until it is detected (at step A5) that there is no compressed data left to be processed in the compressed video data buffer 11. Here, in FIG. 6, the audio processing of step A3 and the video processing at step A4 are depicted to be performed sequentially. However, in the embodiment, the audio processing at step A3 is performed whenever an interruption occurs for the audio data processing, as beforehand described. This means interrupting the video processing at step A4 even when it is under execution at the time.

Figure 7:
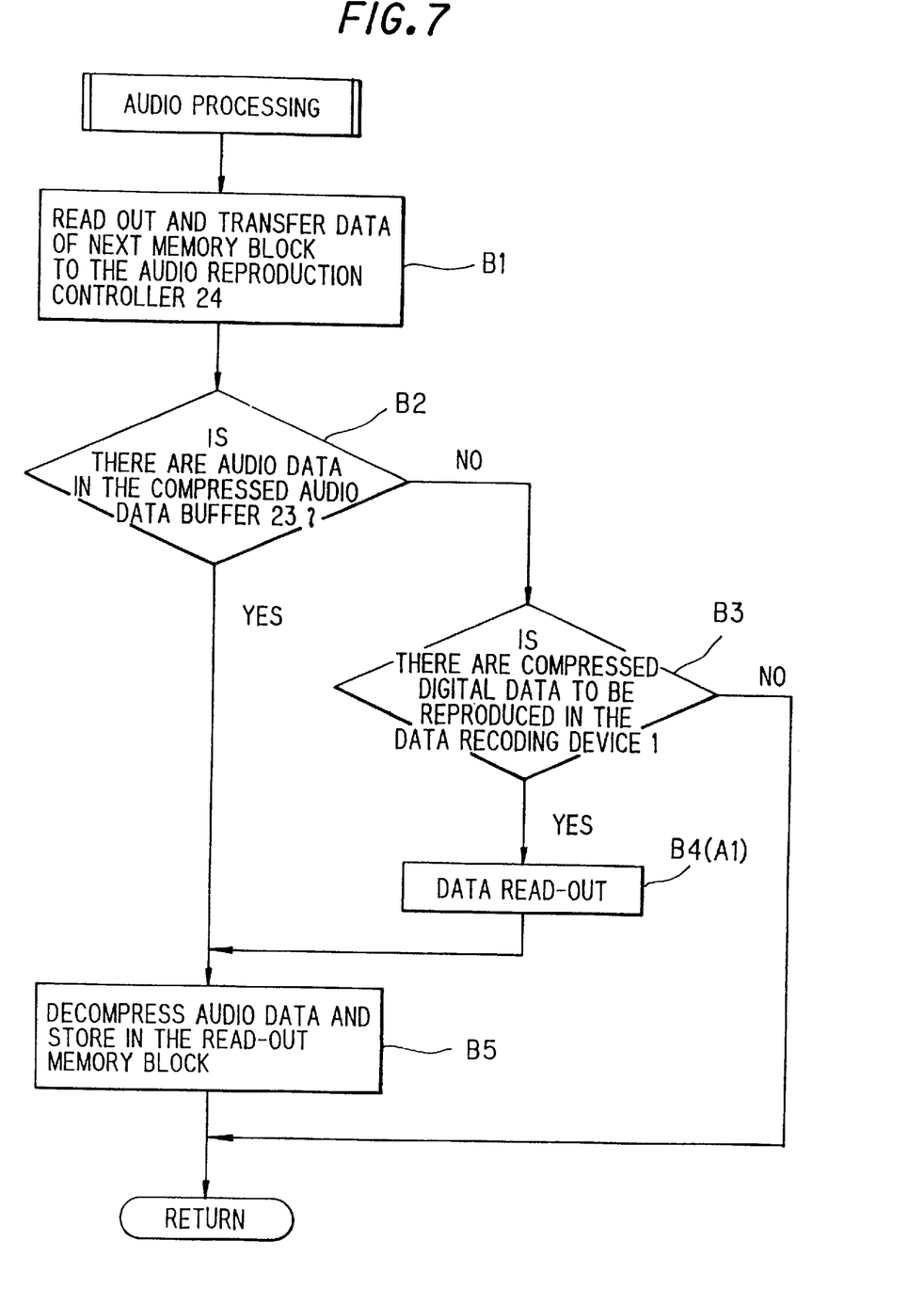
FIG. 7 is a flowchart illustrating details of the audio processing performed by an interruption at step A3 of FIG. 6.

FIG. 7 is a flowchart illustrating details of the audio processing performed by an interruption at step A3 of FIG. 6.

When there is no data in the audio reproduction controller 24, an interruption occurs and data of a first/next memory block in the PCM buffer 23 are read out and transferred to the audio reproduction controller 24 (at step B1). This data is converted into analog signals to be supplied to the speaker 7 according to a sampling frequency indicated by the audio header information. Then (at step B5), the compressed data of the audio signal component is read out from the compressed audio data buffer 21, decompressed by the audio decoder 22 and stored in the first/next memory block which is read out, on condition that there is compressed data left to be processed in the compressed audio data buffer 21. Then, the audio processing returns, waiting a next interruption. When it is detected (at step B2) that there is no compressed data to be processed in the compressed audio data buffer 21, the data read-out at step B4 is performed in the same way as with step A1 described in connection with the initialization procedure of FIG. 6, if it is detected (at step B3) that there is compressed digital data of AV signals left to be reproduced in the data recording device 1. When there is detected no compressed digital data of AV signals left to be reproduced in the data recording device 1, only the data read-out and transferred at step B1 is performed for each interruption until data of all the memory blocks in the PCM buffer 23 are transferred to the audio reproduction controller 24.

Thus, the audio signal component is reproduced without interruption.

Figure 8:
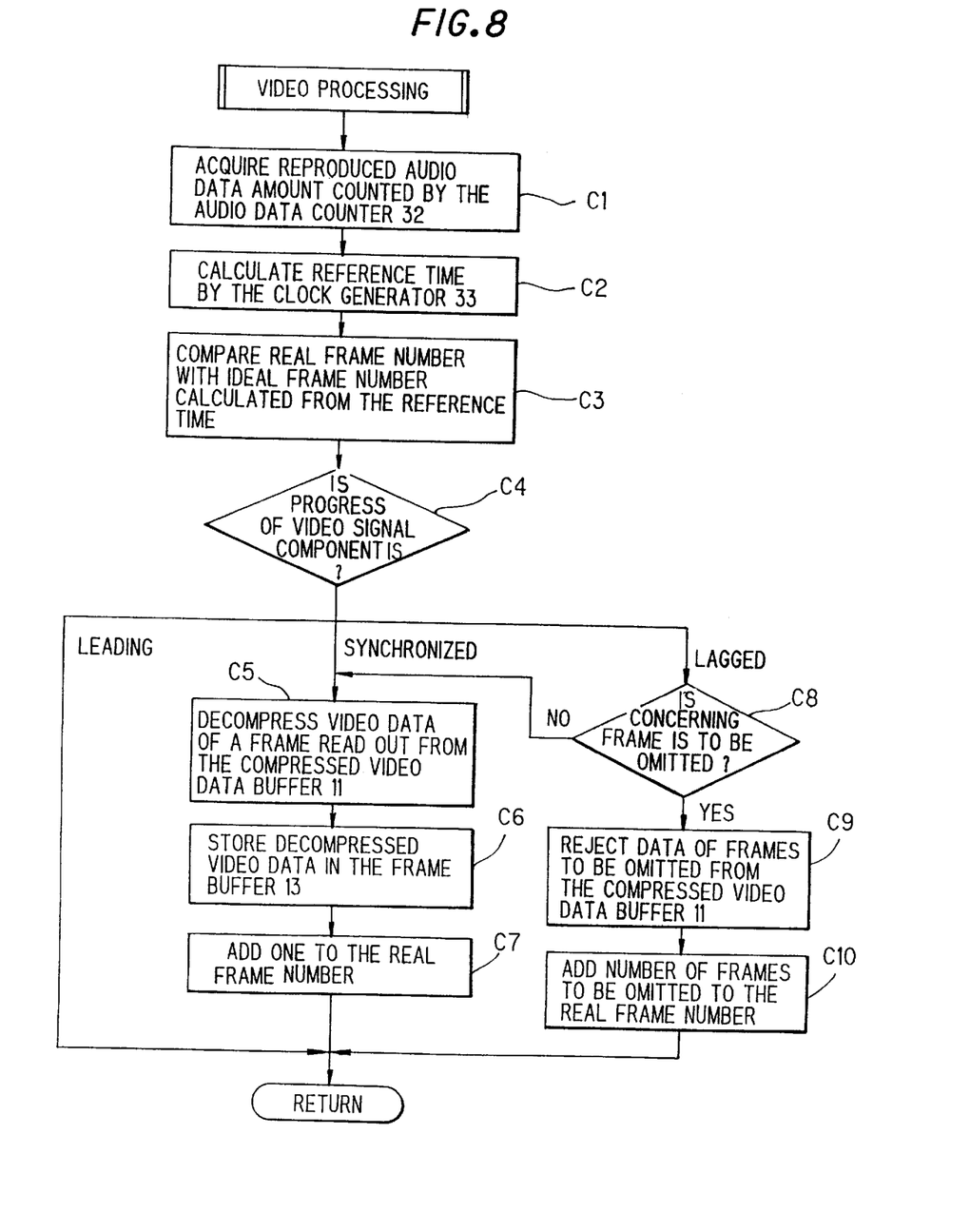
FIG. 8 is a flowchart illustrating details of the video processing performed at step A4 of FIG. 6.

Now, details of the video processing at step A4 of FIG. 6 is described referring to the flowchart of FIG. 8, wherein the synchronization control and decompression of the video signal component are performed.

First (at step C1), the data amount of the audio signal component actually decompressed and reproduced by the audio reproduction controller 24 from the beginning of reproduction is acquired from the audio data counter 32. Then (at step C2), the reference time indicating the reproduction time passage of the audio signal component is calculated by the clock generator 33 from the data amount referring to the audio header information obtained at step A2 of FIG. 6, as follows.

When the audio header information indicates audio data of Layer I, audio stream bit rate of 192,000 bits/sec, sampling frequency of 44.1 KHz and 2-channel stereo signal, for example, 2 channels of analog signals are generated by the audio reproduction controller 24 from 2×16 bits×44,100/sec of the decompressed data supplied from the PCM buffer 23. Therefore, when the data amount of D bytes is acquired from the audio counter 32, the reference time T is calculated as T(sec)=D×8/(44,100×2×16).

Thus, the reference time T is calculated according to the data amount D counted by the audio data counter 32 from the reproduction information supplied from the audio reproduction controller 24, independent of the software timer of the system without needing any special hardware timer.

Here, this data amount D is compensated by the audio data counter compensator 43 as will be described afterwards, when the playback is begun from a playback point other than the top of the system stream 201.

By multiplying the reference time T by a frame rate of 30 frames/sec, for example, indicated by the video header information, the ideal frame number FI=30T is obtained, which is compared to the real frame number FR (at step C3) by calculating progress PR=FR−FI of the video signal component.

Here also, the real frame number FR counted by the video frame counter is compensated by the video frame counter compensator 42, when the playback is begun from a playback point other than the top of the system stream 201.

When the progress PR=0, the video signal component is synchronized to the audio signal component. The video signal component is leading when the progress PR is positive and lagged when the progress PR is negative. However, when the decompression waiting or the frame omission is performed directly according to positive/negative of the progress PR, the control becomes unstable. Therefore, a threshold range is preferably provided for the synchronization discrimination. In the embodiment, when −4<progress PR<1, the video signal component is deemed to be synchronized to the audio signal component (at step C4), considering the fact that the lead of the video signal component gives a sense of more incongruity than the lag thereof.

Returning to FIG. 8, when the ideal frame number FI is 10 and the real frame number FR is 11, for example, the video signal component is deemed to be leading the audio signal component, the progress PR being one, and control of the video processing returns directly from step C4. The video processing of step A4 of FIG. 6, that is, steps C1 to C4 of FIG. 8 are repeated (including the audio processing of step A3, when there is an interruption) until the progress PR becomes less than one, the ideal frame number becoming more than 11, in the example. Thus, the decompression waiting is performed in the embodiment.

When the ideal frame number FI is 10 and the real frame number is 8, for example, the video signal component is deemed to be synchronized with the audio signal component, the progress PR being −2. In this case, the control goes to step C5 from step C4. Compressed data of a frame is read out from the compressed video data buffer 11, decompressed by the video decoder 12, and stored in the frame buffer 13 (at step C6) to be displayed on the CRT monitor 6 by the video display controller 14. Then (at step C7), the real frame number FR is added with one, and the control returns.

When the ideal frame number FI is 10 and the real frame number is 5, for example, the video signal component is deemed to be lagged from the audio signal component, the progress PR being −5. In this case, the control goes to step C8, where the omission priority of the concerning frame is checked. In the embodiment, the frame omission is set not to be performed for the I and the P-picture, the control going to step C5 in the case for performing the decompression of the concerning frame. If it is the B-picture, the control goes to step C9 for rejecting data of the concerning frame from the compressed data buffer 11, and the real frame number is added with one at step C10 in the same way as with step C7.

Thus, the synchronized play back of the AV signals is performed in the embodiment.

Here, the frame omission is described to be performed only for B-pictures. However, the frame omission may be set to be performed for the P or I-frames too, by providing a second and a third threshold value according to the omission priority, for example, when the progress PR is lower than the second and the third threshold value. In that case, data of the compressed video data buffer 11 is to be rejected until data of next I-frame at step C9 and the real frame number FR is to be added at step C10 with a number of frames rejected at step C9.

Now, reproduction of the AV signals from a part of the system stream 201 is described when a playback indication from a playback point is designated by the user.

At step S4 of FIG. 5, the playback controller 41 delivers information of the playback point to the video frame counter compensator 42 and the audio data counter compensator 43, with a form of a time interval IT, 10 seconds for example, of the playback point from the top of the AV program.

The audio data counter compensator 43 calculates a data amount ID to be reproduced from the top of the AV program to the playback point as follows referring to the audio header information acquired at step S1:

ID=2 channels×16 bits×44,100 samples×IT/8 bits
  =1,764,000 bytes, which is to be added to the data amount D counted by the audio data counter 32 for the compensation.

In the same way, the video frame counter compensator 42 calculates a frame number IF to be added, for the compensation, to the real frame number FR counted by the video frame counter 31, as follows.

*IF=30 frames/sec×IT=300*

The AV separation unit 2, which is indicated at step S5 to begin extraction from the playback point of the video signal component and the audio signal component by reading out the compressed digital data from the data recording device 1, calculates a data position to read out from the top of the system stream 201 considering the data rate of the system stream.

When the data rate of the system stream 201 is 1,200,000 bits/sec, the data position to read out becomes (1,200,000/8)×10 (sec)=1,500,000 bytes from the top of the system stream 210.

A sequence of packets beginning with a packet including the data position above calculated are read out and separated into the video stream 202 and the audio stream 203 to be stored in the compressed video data buffer 11 and the compressed audio data buffer 21.

The audio decoder 22 begins to decode the compressed data of the audio signal component from the first audio frame of the audio stream 203 prepared in the compressed audio data buffer 21 in the same way as beforehand described in connection with FIG. 6 and FIG. 7 with a priority. The video decoder 12 begins to decode the compressed data of the video signal component from the first picture of the video stream 202 prepared in the compressed video data buffer 11, in a similar way with the processes described referring to FIG. 8.

Here, when the first picture of the video stream is a B or P picture, it can not be decoded because there is no key frame. Therefore, data of pictures preceding an I picture are treated in the same way with the picture frame to be omitted, that is, data of the frames are rejected at step C9 and a number of omitted frames is added to the real frame number at step C10.

Furthermore, the acquired (at step C1) reproduced audio data amount D counted by the audio data counter 32 is compensated by adding the data amount ID above described by the audio data counter compensator 43, from which the clock generator 33 calculates the reference time (at step C2). At step C3, the compensated real frame number, that is the addition of the real frame number FR and the compensation frame number IF is compared with the ideal frame number FI calculated from the reference time thus calculated.

Thus, the synchronized playback of the AV signals can be performed without depending upon a software timer or the hardware timer even when the AV signals are reproduced from a part of a AV programs.

The compensation values ID and IF are both approximation and presentation timings of the first audio frame in the audio stream 203 and that of the first picture frame in the video stream 202 and may have a little difference with each other. The difference of the presentation timing can be compensated making use of time stamps in the concerning packet header information. However, the difference is very little and it has been found that there is no incongruity even without compensating the difference.

As heretofore described, the synchronization control of the AV signals is performed according to the data amount D counted by the audio data counter 32 from the reproduction information supplied from the audio reproduction controller 24 and the compensation amount ID in the embodiment. As such, the video signal component can be decompressed and reproduced in synchronization with the audio signal component adequately from the compressed digital data with a simple configuration, independent of resolution of the software timer of a system wherein the apparatus of the embodiment is applied, and without needing any special hardware timer.

The audio signal component is processed with a priority to be reproduced without any interruption, and even when the frame omission is necessary. The processing of the audio signal component is performed according to priority of frames, enabling a smooth presentation of the video signal component, eliminating unnecessary frame omission, and in accordance with the data processing ability of the system.

What is claimed is:

1. An apparatus for synchronized playback of system signals having an audio signal component and a video signal component, said apparatus comprising:

a clock generator which calculates a reference time indicating reproduction time passage of said audio signal component from an amount of reproduced data of said audio signal component added with a compensation amount, and by referring to a sampling rate of the audio signal component and a frame rate of the video signal component;

a delay detector coupled to said clock generator, said delay detector detects a progress of said video signal component by comparing a real frame number added with a compensation number of said video signal component to an ideal frame number, said real frame number indicating a number of processed picture frames of said video frame component, said ideal frame number being the product of said reference time and said frame rate of said video signal component;

an audio data counter compensator coupled to said clock generator, said audio data counter compensator calculates said compensation amount from a playback point of said system signal where synchronized playback is requested; and a video frame counter compensator coupled to said delay detector, said video frame counter compensator calculates said compensation number from said playback point of said system signal where synchronized playback is requested.

2. The apparatus for synchronized playback of system signals as claimed in claim 1, wherein said apparatus further comprises:

a video frame counter which counts and maintains said real frame number by accumulating a number of picture frames actually decompressed and a number of picture frames omitted to be decompressed; and wherein said delay detector includes a calculator which calculates said ideal frame number of said video signal component to be displayed from said reference time and said frame rate of said video signal components, and detects said progress of the video signal component by comparing said real frame number added with said compensation number to said ideal frame number.

3. The apparatus for synchronized playback of system signals as claimed in claim 1, further comprising a frame omission controller coupled to said delay detector, said frame omission controller compensates for a difference in display timing between said video signal component and said reference time by performing one of frame omission and decompression waiting of said video signal component according to said progress of the video signal component.

4. The apparatus for synchronized playback of system signals as claimed in claim 3, wherein said frame omission is performed according to an order of priority attributed to frames of said video signal component subject to said frame omission based upon kinds of said frames.

5. The apparatus for synchronized playback of system signals as claimed in claim 3, wherein said decompression waiting is performed by controlling decompression of compressed data of a frame of said video signal component to wait until said difference of display timing of said frame from said reference time is within a threshold value.

6. The apparatus for synchronized playback of system signals as claimed in claim 1, wherein said audio data counter compensator and video frame counter compensator further refers to a time difference between a first time stamp found in compressed data of said video signal component to be reproduced, indicating presentation timing of data which follows said first time stamp, and a second time stamp found in compressed data of said audio signal component to be reproduced, indicating presentation timing of data following said second time stamp.

7. The apparatus as claimed in claim 1, wherein said clock generator, said audio data counter compensator, and said video frame counter compensator refer to header information disposed in said system signals.

8. The apparatus as claimed in claim 3, further comprising:

an audio reproduction controller; and wherein said audio signal component is processed by said audio reproduction controller without significant interruption.

9. A method for synchronizing playback of system signals having an audio signal component and a video signal component, said method comprising:

calculating a reference time indicating reproduction time passage of said audio signal component from an amount of reproduced data of said audio signal component added with a compensation amount, and by referring to a sampling rate of the audio signal component and a frame rate of the video signal component;

detecting a progress of said video signal component by comparing a real frame number added with a compensation number of said video signal component to an ideal frame number, said real frame number indicating a number of processed picture frames of said video frame component, said ideal frame number being the product of said reference time and said frame rate of said video signal component;

calculating said compensation amount from a playback point of said system signal where synchronized playback is requested; and calculating said compensation number from a playback point of said system signal where synchronized playback is requested.

10. The method for synchronizing playback of system signals as claimed in claim 9, wherein said detecting comprises:

maintaining said real frame number by accumulating a number of picture frames actually decompressed and a number of picture frames omitted to be decompressed;

calculating an ideal frame number of said video signal component to be displayed from said reference time and said frame rate of said video signal components, and detecting said progress of the video signal component by comparing said real frame number added with said compensation number to said ideal frame number.

11. The method for synchronizing playback of system signals as claimed in claim 9, further comprising compensating for a difference in display timing between said video signal component and said reference time by performing one of frame omission and decompression waiting of said video signal component according to said progress of the video signal component.

12. The method for synchronizing playback of system signals as claimed in claim 11, wherein said frame omission is performed according to an order of priority attributed to frames of said video signal component subject to said frame omission based upon kinds of said frames.

13. The method for synchronizing playback of system signals, as claimed in claim 11, wherein said decompression waiting is performed by controlling decompression of compressed data of a frame of said video signal component to wait until said difference of display timing of said frame from said reference time is within a threshold value.

14. The method for synchronizing playback of system signals, as claimed in claim 9, wherein said calculating of said compensation amount and said compensation number further comprises referring to a time difference between a first time stamp found in compressed data of said video signal component to be reproduced, indicating presentation timing of data which follows said first time stamp, and a second time stamp found in compressed data of said audio signal component to be reproduced, indicating presentation timing of data following said second time stamp.

15. The method of synchronizing playback of system signals as claimed in claim 9, wherein all of said calculating further includes referring to a header of said system signal.

16. The method of synchronizing playback of system signals, as claimed in claim 9, further comprising processing said audio signal component.

* * * * *